(12) United States Patent
Wood et al.

(10) Patent No.: US 6,656,380 B2
(45) Date of Patent: Dec. 2, 2003

(54) SUPER-COOLABLE COMPOSITION HAVING LONG-DURATION PHASE CHANGE CAPABILITY, PROCESS FOR PREPARATION OF SAME, PROCESS FOR SUPER-COOLING SAME AND ARTICLES COMPRISING SAME

(75) Inventors: Brian Wood, Lubbock, TX (US); Allan J. Cassell, Melbourne (AU)

(73) Assignee: Supachill Technologies Pty. Ltd., West Heidelberg (AU)

( * ) Notice: Subject to any disclaimer, the term of this patent is extended or adjusted under 35 U.S.C. 154(b) by 0 days.

(21) Appl. No.: 09/978,851

(22) Filed: Oct. 16, 2001

(65) Prior Publication Data

US 2003/0070436 A1 Apr. 17, 2003

(51) Int. Cl.$^7$ ................................................ C09K 5/00
(52) U.S. Cl. ........................................................ 252/67
(58) Field of Search ........................................... 252/67

(56) References Cited

U.S. PATENT DOCUMENTS

| | | | |
|---|---|---|---|
| 3,412,476 A | 11/1968 | Astrom | 34/147 |
| 3,653,494 A | 4/1972 | Miller | 198/195 |
| 3,866,432 A | 2/1975 | Harrison | 62/208 |
| 4,155,707 A | * | 5/1979 | Franceschini et al. ....... 8/2.5 R |

(List continued on next page.)

FOREIGN PATENT DOCUMENTS

| | | | |
|---|---|---|---|
| AU | 2120099 | 9/1999 | ........... F25D/17/02 |
| DE | 1238618 | 4/1967 | |
| EP | 0 174 170 | 12/1986 | ........... F25D/17/02 |
| EP | 0 275 114 | 7/1988 | ............. F25C/1/00 |
| EP | 0 331 296 | 9/1989 | ........... A23B/7/144 |
| GB | 765760 | 1/1957 | |
| GB | 999377 | 7/1965 | |
| GB | 1 395 651 | 5/1975 | ............. A61J/3/02 |
| GB | 2 146 418 A | 4/1985 | ............. F25D/3/00 |
| JP | 63273776 | 11/1988 | ........... F25D/13/06 |
| JP | 64000219 | 5/1989 | ............. C21D/1/18 |
| JP | 0126075 | 5/1990 | ........... F25D/13/00 |
| WO | WO 91/02202 | 2/1991 | ........... F25D/23/02 |
| WO | WO 97/35155 | 9/1997 | ........... F25D/31/00 |
| WO | WO 01/95716 A2 | 12/2001 | ............. A01N/1/00 |

*Primary Examiner*—John Hardee
(74) *Attorney, Agent, or Firm*—Raymond M. Galasso; Simon, Galasso & Frantz PLC (57) ABSTRACT

An article according to one embodiment of the disclosures herein includes a cooling core body, a cooling member and a super-coolable composition. The cooling core body has a core cavity therein. The cooling member disposed in the core cavity. A super-coolable composition is disposed within the core cavity encapsulating at least a portion of the cooling member.

11 Claims, 11 Drawing Sheets

U.S. PATENT DOCUMENTS

| | | | |
|---|---|---|---|
| 4,167,101 A | 9/1979 | Rojey | 62/102 |
| 4,311,019 A | 1/1982 | Rojey et al. | 62/101 |
| 4,341,084 A | 7/1982 | Rojey et al. | 62/101 |
| 4,429,542 A | 2/1984 | Sakao et al. | 62/62 |
| 4,480,445 A | 11/1984 | Goldstein | 62/434 |
| 4,554,797 A | 11/1985 | Goldstein | 62/434 |
| 4,619,257 A | 10/1986 | Linner et al. | 128/303.1 |
| 4,647,543 A | 3/1987 | Stocker | 436/174 |
| 4,676,070 A | 6/1987 | Linner | 62/64 |
| 4,848,094 A | 7/1989 | Davis et al. | 62/64 |
| 4,888,956 A | 12/1989 | Le Roux Murray | 62/51.1 |
| 4,901,844 A | 2/1990 | Palmaer et al. | 198/778 |
| 4,971,842 A | 11/1990 | Sippola | 427/433 |
| 4,985,169 A | 1/1991 | Rolland et al. | 252/69 |
| 5,003,787 A | 4/1991 | Zlobinsky | 62/185 |
| 5,022,236 A | 6/1991 | Knippscheer et al. | 62/529 |
| 5,191,773 A | 3/1993 | Cassell | 62/373 |
| 5,222,367 A | 6/1993 | Yamada | 62/64 |
| 5,326,706 A | 7/1994 | Yland et al. | 435/283 |
| 5,328,821 A | 7/1994 | Fisher et al. | 435/1 |
| 5,338,662 A | 8/1994 | Sadri | 435/1 |
| 5,362,622 A | 11/1994 | O'Dell et al. | 435/1 |
| 5,496,456 A | 3/1996 | Fischer et al. | 204/201 |
| 5,560,956 A | 10/1996 | Schmehl | 427/2.11 |
| 5,638,686 A | 6/1997 | Coelho et al. | 62/51.1 |
| 5,860,282 A | 1/1999 | Liberman et al. | 62/63 |
| 5,873,254 A | 2/1999 | Arav | 62/63 |
| 5,891,617 A | 4/1999 | Watson et al. | 435/1.3 |
| 6,140,123 A | 10/2000 | Demetriou et al. | 435/374 |
| 2002/0026799 A1 * | 3/2002 | Okamura et al. | 62/6 |

* cited by examiner

SUPER-COOLABLE COMPOSITION HAVING LONG-DURATION PHASE CHANGE CAPABILITY, PROCESS FOR PREPARATION OF SAME, PROCESS FOR SUPER-COOLING SAME AND ARTICLES COMPRISING SAME

FIELD OF THE DISCLOSURE

The disclosures herein relate generally to super-coolable compositions and more particularly to a super-coolable composition having long-duration phase change capability, a process for preparation of such super-coolable composition, a process of super-cooling such super-coolable composition and articles comprising such super-coolable composition.

BACKGROUND OF THE DISCLOSURE

In many situations, it is desirable, if not necessary, to maintain an item such as a donor organ for a transplant, a food item or a biological specimen in a particular thermal condition. Examples of thermal conditions include being maintained at a prescribed temperature, within a prescribed temperature range or below a prescribed temperature. Failure to maintain the item in the particular thermal condition may adversely affect the viability, freshness and/or usefulness of the item.

Conventional insulated containers include provisions for maintaining an item contained therein in a particular thermal condition. Passive-type-insulated containers include insulating material for reducing the rate of heat transfer between contents therein and an ambient environment. Other than such insulating material, no other means is provided for maintaining an item contained therein in a particular thermal condition. Active-type-insulated containers include insulating material and a climate preservation implement. The climate preservation implement is capable of actively maintaining a volume of the container at a particular thermal condition. Powered cooling devices and conventional thermal masses (e.g. freezable cold packs) are examples of climate preservation implements.

Conventional insulated containers suffer from several limitations that impair their ability to maintain a contained item at a particular thermal condition for an extended period of time and to achieve/sustain extreme thermal conditions. Examples of such limitations include a limited time duration that conventional thermal masses can maintain a frozen/chilled state, the degree of super-cooling achievable by conventional thermal masses, the limited time a portable power supply can sustain the operation of a powered cooling device and the operating efficiency, weight and space associated with such powered cooling device. These limitations reduce the effectiveness and versatility of conventional insulated containers and/or conventional thermal masses.

Therefore, a super-coolable composition having long-duration phase change capability, a process for preparation of such super-coolable composition, a process of super-cooling such super-coolable composition and articles comprising such super-coolable composition that overcome these limitations, individually and/or jointly, are useful.

DETAILED DESCRIPTION

FIGS. 1 through 16 depict, according to various embodiments of the disclosures made herein, a super-coolable composition, a process for preparation of such super-coolable composition, a process of super-cooling such super-coolable composition and articles comprising such super-coolable composition. Such super-coolable composition and its associated preparation process, super-cooling process and articles provide advantageous capabilities and characteristics. Specifically, the super-coolable composition exhibits a very long-duration capability and returns to a pre-frozen gel consistency after being super-cooled and thawed. Super-coolable materials as disclosed herein, are formulated to suit the specific requirements and/or application and then, after being super-cooled, have been exhibited to maintain a desired below freezing temperature for as long as 50 hours.

Articles as disclosed herein are capable of having a super-cooled cooling fluid circulated through a cooling member encapsulated in the supercoolable composition for facilitating super-cooling of the super-coolable composition.

The cooling member facilitates an initial super-cooling operation for taking the super-coolable composition to a super-cooled state. The cooling member also enables subsequent super-cooling operations for 'recharging' the super-coolable composition to the super-cooled state after the super-coolable composition has fully or partially thawed. Examples of articles as disclosed herein include portable and transportable cooler-type products, portable and transportable refrigeration unit and transportable containers for biology and pathology samples and/or drugs.

Figure 1:
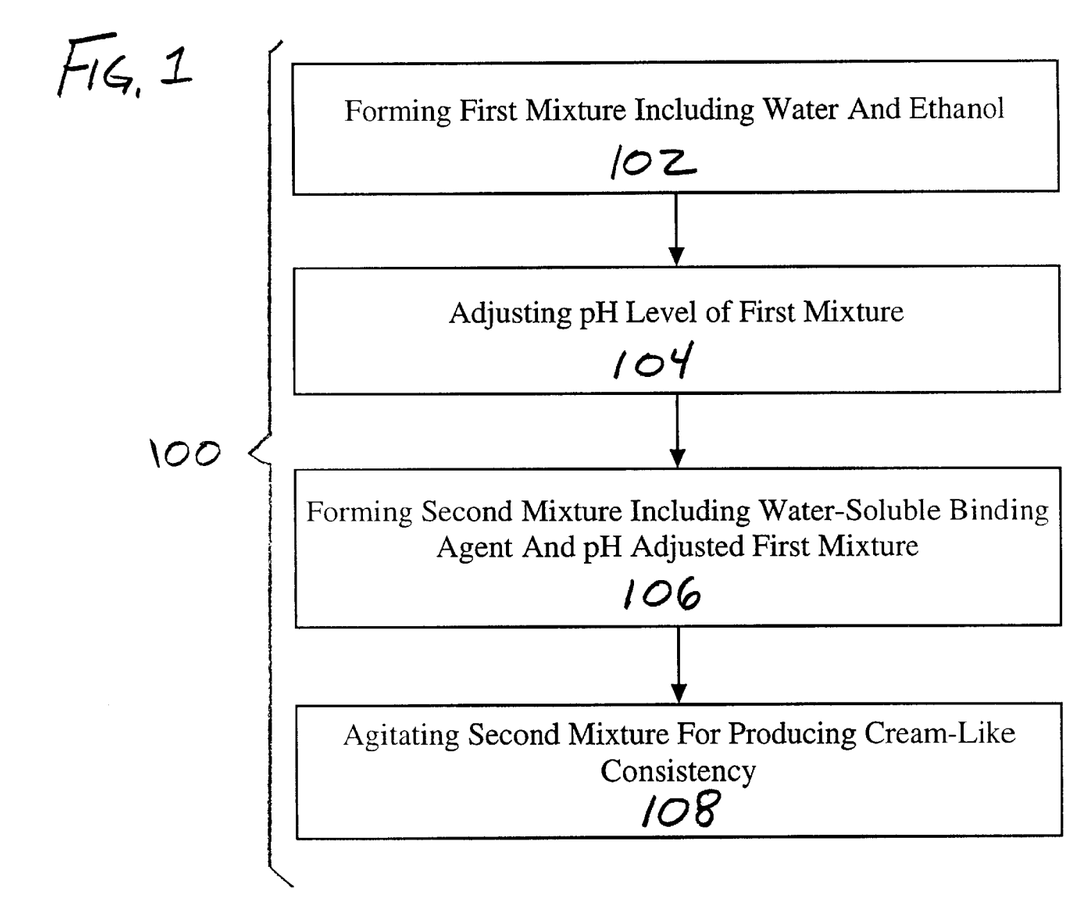
FIG. 1 is a flow chart view depicting a process for preparation of a super-coolable composition in accordance with an embodiment of the disclosures made herein.

FIG. 1 depicts a process 100 for preparation of a super-coolable composition in accordance with a first embodiment of the disclosures made. In the process 100, an operation 102 is performed for forming a first mixture including water and ethanol. The ratios of water and ethanol will depend on the desired freezing point. Higher ratios of ethanol will generally translate to lower freezing temperatures. Depending on the application, potable water may or may not be used. Stirring and blending water and Ethanol are examples of a technique for forming the first mixture. It is contemplated and disclosed herein that Ethanol may be substituted with other compositions such as, for example, methylated spirits, salt based solutions and the like.

After performing the operation 102 for forming the first mixture, an operation 104 is performed for adjusting the pH level of the first mixture. Accordingly, a pH adjusted first mixture is formed. Adding an alkaline or acidic substance to the first mixture is an example a technique for adjusting the pH level of the first mixture. Sodium bicarbonate is an example of a slightly alkaline substance. In one embodiment of the operation 102, adjusting the pH of the first mixture includes adjusting the pH level of the first mixture about 8.0.

After performing the operation 104 for adjusting the pH level of the first mixture, an operation 106 is performed for forming a second mixture including the pH adjusted first mixture and a binding agent. Stirring and blending the binding agent and the pH adjusted first mixture are examples of a technique for forming the second mixture. Cellulose Ester such as that offered by DOW Chemical Company under the tradename Methocel is an example of a commercially-available water-soluble binding agent. Methylcellulose and hydroxypropyl methylcellulose are examples of two different types of cellulose esters.

About 3% cellulose ester, by weight, is preferred for a mixture of about 30% ethanol to about 70% water. As little as 1% to 2% cellulose ester, by weight, is preferred as the percent of ethanol approaches zero. The PH level is preferably about 8 for the cellulose content disclosed above. However, it is contemplated and disclosed herein that the composition may have a pH level different than about 8 depending on the specific requirements of the composition. The importance of the pH being adjusted to a desired level is that by adjusting the PH level up or down influences the time frame in which the mix will gel.

After the operation 106 is performed for forming the second mixture, an operation 108 is performed for agitating the second mixture until the viscosity of the second mixture increases, thus providing the second mixture with a cream-like consistency. Stirring and blending are examples of agitating. The second mixture is a super-coolable composition including water, ethanol, a substance capable of adjusting the pH of a water and alcohol mixture to about 8, and water-soluble binding agent.

EXAMPLE 1

Forming a Super-Coolable Composition for Freezing at About −18 Degrees Celsius

Ethanol and potable water are blended at ratios of about 30% and about 70%, respectively, by weight, thus forming a first mixture. Sodium bicarbonate is then blended into the mixture of ethanol and water in a quantity sufficient to achieve a pH level of the mixture to about 8. Accordingly, a pH adjusted first mixture is formed. After forming the pH adjusted first mixture, Methocel brand cellulose ester is stirred in the pH adjusted first mixture at about 3% by weight to the mixture of water, ethanol and sodium bicarbonate, thus forming a second mixture. The second mixture is then stirred until a cream-like consistency is achieved. The second mixture is a super-coolable composition including water, ethanol, sodium bicarbonate and cellulose ester.

About 10 minutes after achieving the cream-like consistency, the second mixture begins to gel. Accordingly, within about 10 minutes of achieving the cream-like consistency, the second mixture is poured into an end use container.

It should be understood that the formulae for mixing super-coolable materials according to embodiments of the disclosures herein will vary depending on the phase change temperature desired and/or required. The example presented above represents only one of many examples of preparing a super-coolable material according to the disclosures herein.

The super-coolable compositions disclosed above in reference to FIG. 1 and Example 1 exhibit a long-duration phase change capability and returns to a pre-frozen gel consistency after being super-cooled and thawed. There is no separation of fluid layers upon super-cooling the composition to −18 degrees Celsius or more and once thawed. The lack of fluid layer separation is advantageous as solubilization of the composition in subsequent cooling cycles increases after a first cooling and thawing cycle. When a super-cooling operation is performed on the composition, a portion of the water in the composition is held in the latent heat super-cooled state and does not freeze. The heat normally released on freezing of the water (referred to as the heat of fusion) is decreased by the amount of super-cooling.

Various aspects of an insulated container 200 according to another embodiment of the disclosures herein are disclosed in reference to FIGS. 2 through 6. The insulated container 200 includes a container body 202 and a container cover 204. The container cover 204 is capable of being moved between a first position P1 and a second position P2. A container cavity 206 is accessible when the container cover 204 is in the first position P1 and is inaccessible when the container cover 204 is in the second position P2. A removable cover arrangement and a hinged cover arrangement are examples of arrangements for allowing the cover to be moved between the first position P1 and the second position P2.

Figure 2:
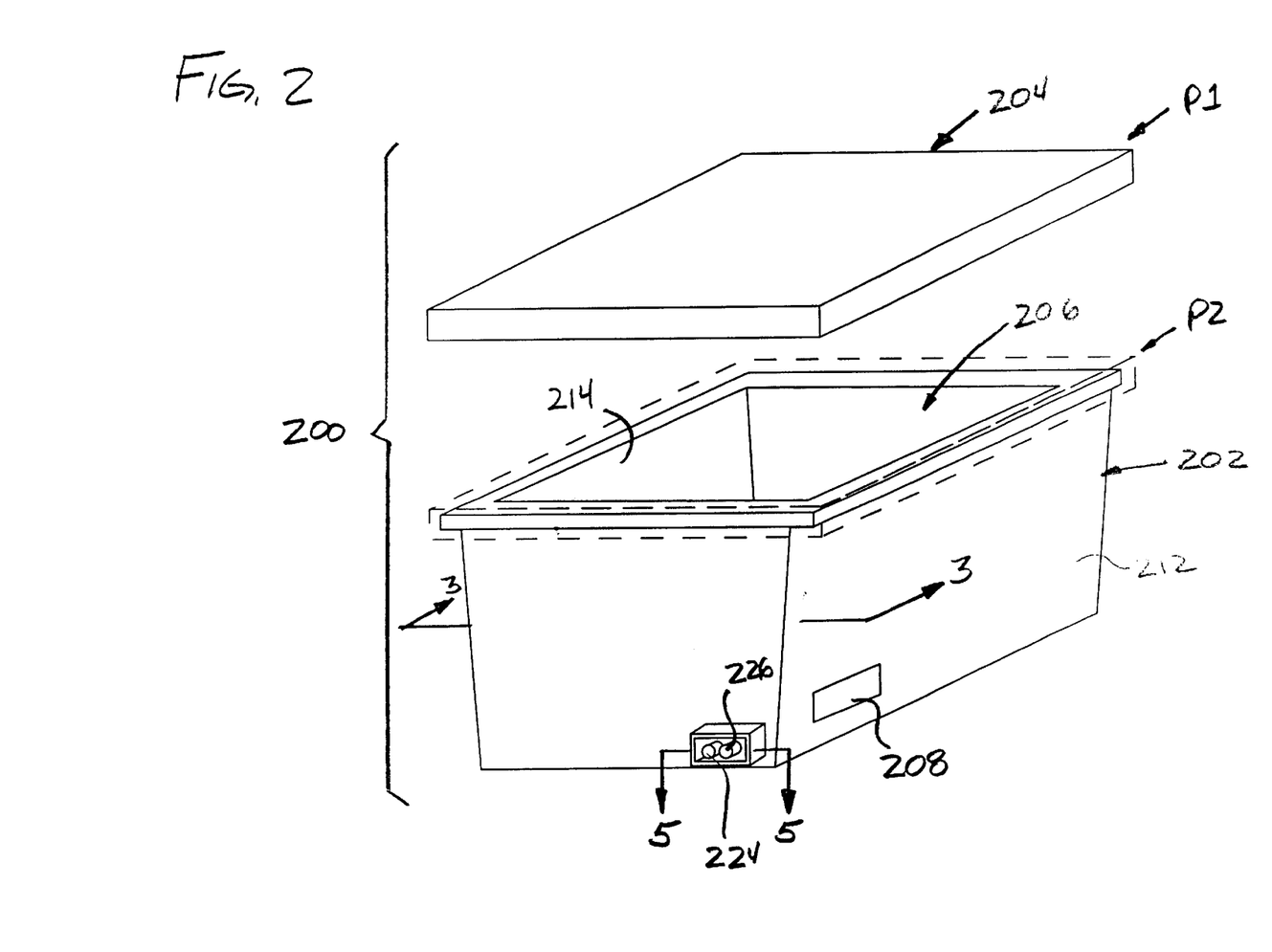
FIG. 2 is a perspective view depicting an insulated container in accordance with a second embodiment of the disclosures herein, wherein the container includes an externally-insulated cooling core assembly.

The insulated container 200 includes an information storage device 208, FIG. 2, attached to the container body 202. It is contemplated herein that the information storage device 208 may be attached to the container cover 204 rather than to the container body 202. A commercially-available radio frequency identification tags such as those offered by Texas Instruments Incorporated is an example of the information storage device 208. The information storage device 208 permits various information about the container 200 and contents of the container 200 to be monitored. For example, information associated with shipping routes, time-to-delivery, ambient temperatures and detailed information about the contents of the container 200 may be transmitted to and received from the information storage device 208.

The container body 202 includes an externally-insulated cooling core assembly 210, an insulating shell 211 and an exterior shell 212. One of the functions of the exterior shell 212 is to protect the insulating shell 211. The cooling core assembly 210 includes a first cooling core shell 214 and a second cooling core shell 216. The first cooling core shell 214 and the second cooling core shell 216 are joined along mating edges using a known technique such as laser welding, ultrasonic welding solvent cement or the like, thus forming a cooling core body. A core cavity 218 is defined within the cooling core body. By externally-insulated, it is meant that insulation is provided external to the core cavity 218. Accordingly, the insulating shell 211 covers a substantial portion of the second cooling core shell 216.

In one embodiment of the first cooling core shell 214 and the second cooling core shell 216, the first cooling core shell 214 and the second cooling core shell 216 are made of polyethylene and are capable of being made using a known technique such as injection molding, rotational molding or blow molding. It is contemplated herein that the first cooling core shell 214 and the second cooling core shell 216 may be independently formed, or jointly formed and subsequently separated as needed.

It is contemplated herein that the insulating shell 211 may have a mono-layer (i.e. an insulating layer) construction or a multi-layer construction. A layer capable of providing conductive insulating functionality, a layer capable of providing vapor permeation functionality and a layer capable of providing radiant insulating functionality are examples potential layers in a multi-layer construction. The insulating shell 211 may be attached to or detached engagement with the cooling core assembly 210. Similarly, the insulating shell 211 may be attached to or detached engagement with the exterior shell 212.

Polystyrene foam and polyethylene foam are examples of material layers capable of providing conductive insulation. PolarTherm brand material offered by Polar Thermal Products LTD is an example of an insulating shell having a multi-layer construction. It is contemplated herein that the insulating shell 211 may be made from flexible materials, compliant materials, rigid materials or a combination thereof.

A cooling member 220 is positioned within the core cavity 218. The cooling member 220 includes a plurality of spaced cooling member segments 222, a first cooling member coupling 224 and a second cooling member coupling 226. The first cooling member coupling 224 and the second cooling member coupling 226 extend through the second cooling core shell 216, the insulating shell 211 and the exterior shell 212. The cooling member 220 is configured such that the plurality of spaced cooling member segments 222 are essentially evenly spaced throughout the core cavity 218 (i.e. present in each wall of cooling core assembly 210). It is contemplated herein that the cooling member 220 may be alternatively configured such that the spaced cooling member segments 222 are present in less than all of the walls of the cooling core assembly 210 and such that the spaced cooling member segments 222 are unevenly spaced.

It is contemplated herein that the cooling member may be fabricated according to a variety of construction arrangements. In one construction arrangement, the cooling member 220 is made from a length of conformable material such as copper or polymeric tube that is bend into a single-pass configuration having a plurality of loops (e.g. back and forth loops). Each loop of such a single-pass configuration defines one of the spaced cooling member segments 222. The single-pass configuration results in a serial flow of a cooling fluid through each one of the spaced cooling member segments 222. In another construction arrangement, the plurality of spaced cooling member segments 222 has a multi-pass coil configuration. In such another construction arrangement, the spaced cooling member segments 222 are connected in a manner that allows a cooling fluid, such as disclosed below in reference to FIGS. 15 and 16, to travel through multiple paths. For example, connecting a plurality of discrete pieces of cooling member segments (straight or having bends) between a first cooling fluid manifold and a second cooling fluid manifold provides such a multi-pass coil configuration.

A cooling coil having plurality of s-shaped coils and a cooling coil having a helical wound configuration are examples of cooling members and/or cooling member segments disclosed herein. It is contemplated herein that cooling members disclosed may be made of metal, polymeric materials, ceramic materials and the like.

At least a portion of the core cavity 218 not occupied by the cooling member 220 is filled with a super-coolable composition 228, such as the super-coolable composition as disclosed herein. The super-coolable composition 228 is dispensed into the core cavity 218 through a suitable aperture (not shown). The aperture is plugged or covered after the super-coolable composition 228 is dispensed into the cooling cavity 218.

The spaced cooling member segments 222 of the cooling member 220 are essentially encapsulated in the super-coolable composition 228. The first cooling member coupling 224 and the second cooling member coupling 226 provide a means for connecting a cooling apparatus to the cooling member 220. As discussed below in reference to FIGS. 15 and 16 in greater detail, the cooling apparatus is capable of circulating a super-cooled cooling fluid through the cooling member 220 for super-cooling the super-coolable composition 228.

Figure 3:
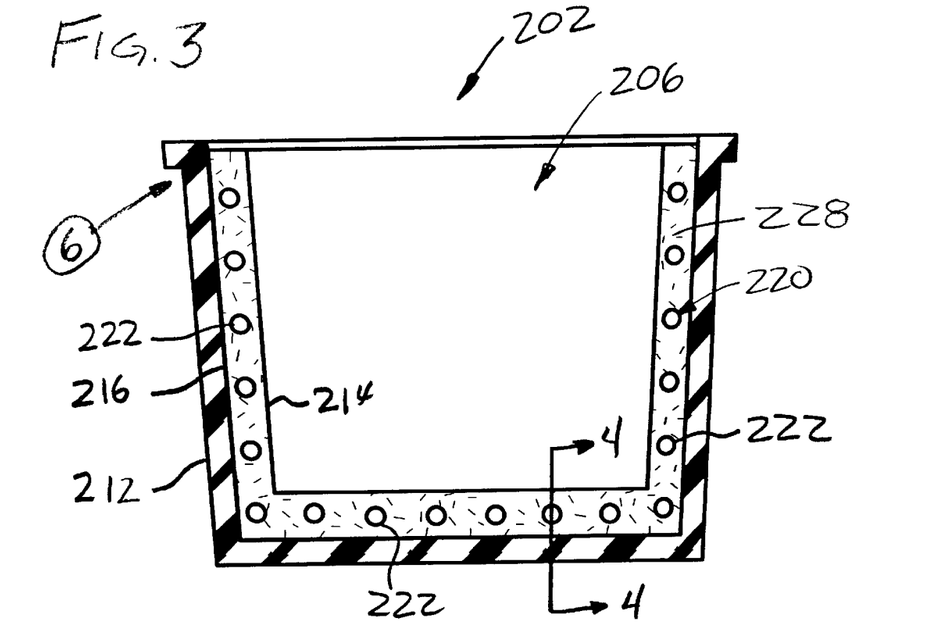
FIG. 3 is a cross-sectional view taken along the line 3—3 in FIG. 2.
Figure 4:
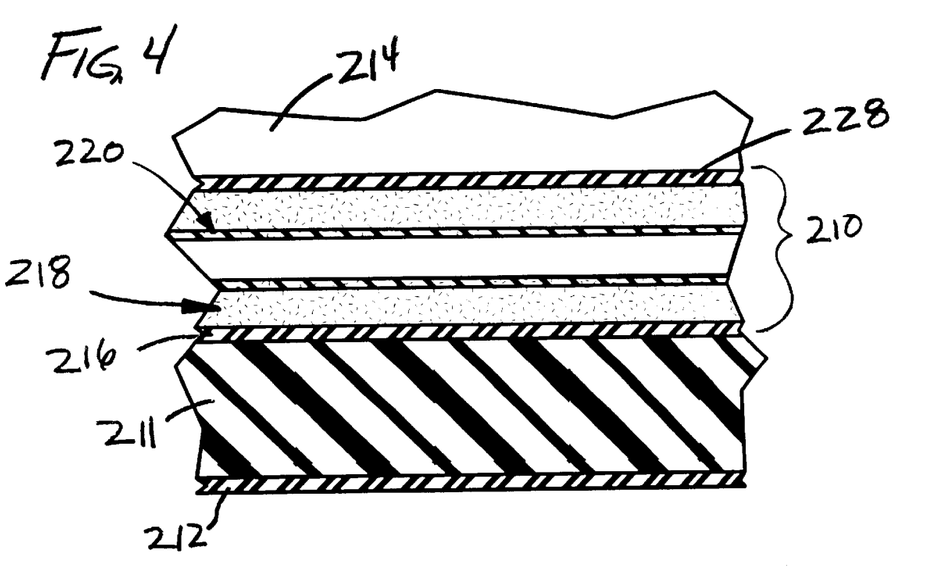
FIG. 4 is a cross-sectional view taken along the line 4—4 in FIG. 3.
Figure 5:
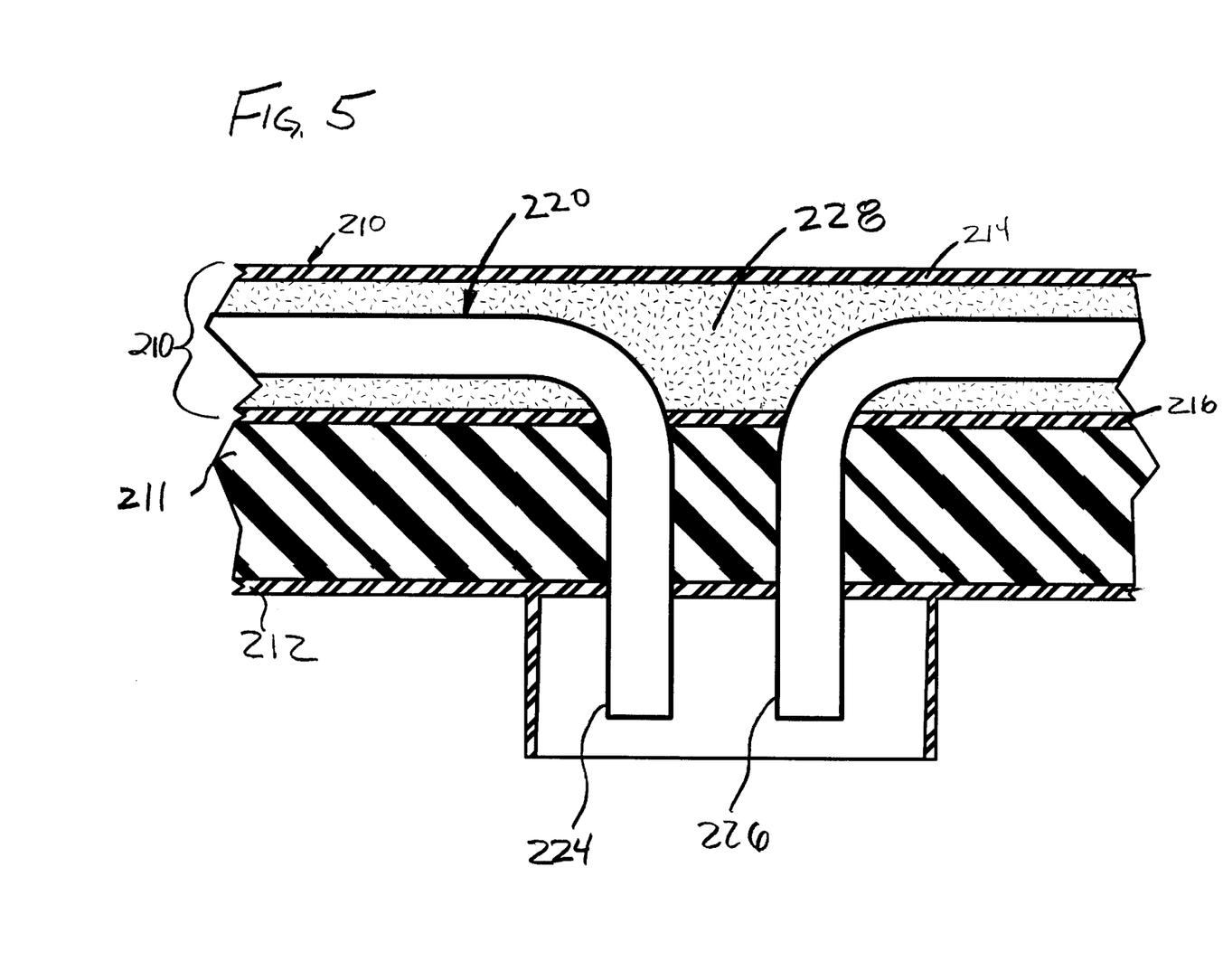
FIG. 5 is a cross-sectional view taken along the line 5—5 in FIG. 2.
Figure 6:
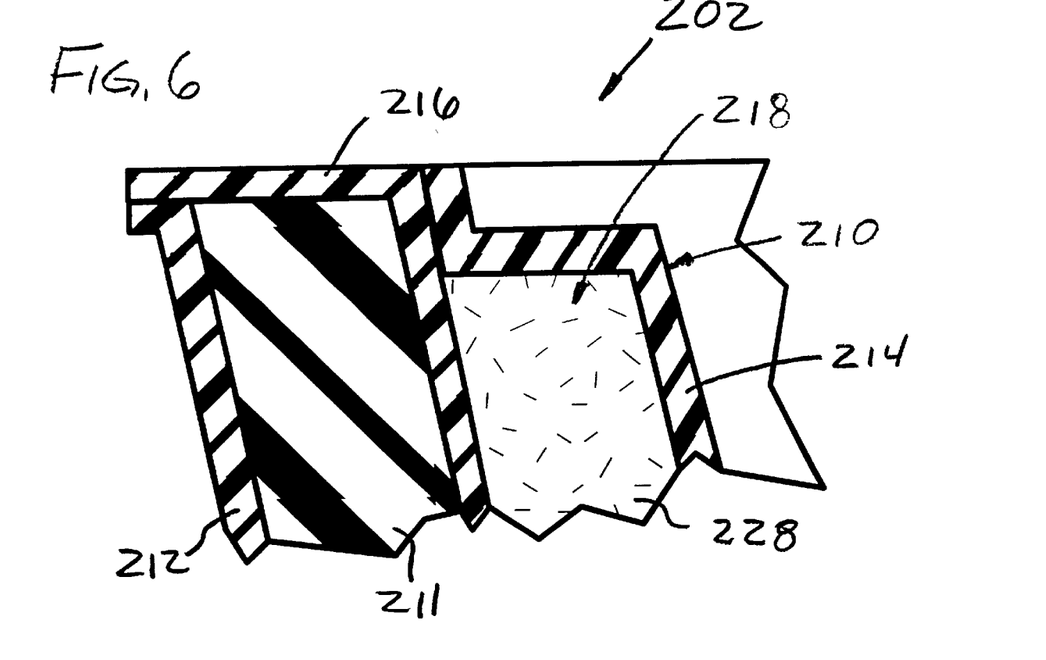
FIG. 6 is an enlarged cross-sectional view taken at the location designated view 6 in FIG. 3.

In one embodiment of the container cover 204, the container cover 204 includes a cooling core assembly with a cooling member and a super-coolable composition disposed within the cooling cavity. In such an embodiment of the container cover 204, it is contemplated herein that the cooling core assembly of the container cover 204 may have an internally-insulated configuration or an externally-insulated configuration, as disclosed herein. In another embodiment of the container cover, the container cover consists of one or more layers of insulating materials.

Figure 7:
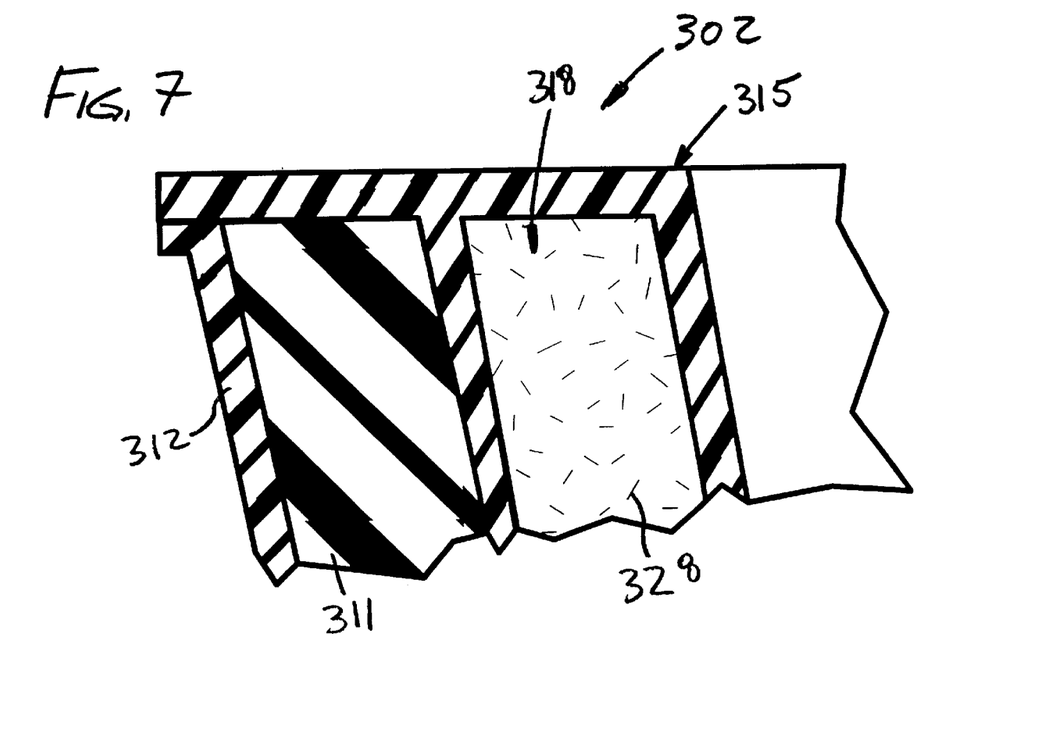
FIG. 7 is a cross-sectional view depicting an externally-insulated cooling core assembly in accordance with an embodiment of the disclosures made herein, wherein the cooling core assembly has a unitary construction and omits a cooling member.

A container body 302 according to another embodiment of the disclosures herein is disclosed in reference to FIG. 7. The container body 302 includes an externally-insulated cooling core assembly 310, an insulating shell 311 and an exterior shell 312. The cooling core assembly 310 includes a cooling core body 315. The cooling core body 315 and the exterior shell 312 are joined along mating edges using a known technique such as laser welding, ultrasonic welding solvent cement or the like.

The cooling core body 315 has a core cavity 318 therein filled at least partially with a super-coolable composition 328. The cooling core body 315 has a unitary construction and is made by known techniques such as blow molding and rotational molding. The unitary construction of the cooling core body 315 precludes a cooling member from being disposed within the core cavity 318. Accordingly, the super-coolable composition 328 within the core cavity 318 is super-cooled by immersing the container body 302 in a tank of super-cooled cooling fluid. Immersing the container body 302 in a tank of super-cooled cooling fluid depicts one embodiment of a cost effective and efficient means of super-cooling the super-coolable composition. Such a tank of super-cooled cooling fluid is discussed below in reference to FIGS. 15 and 16 in greater detail.

Figure 8:
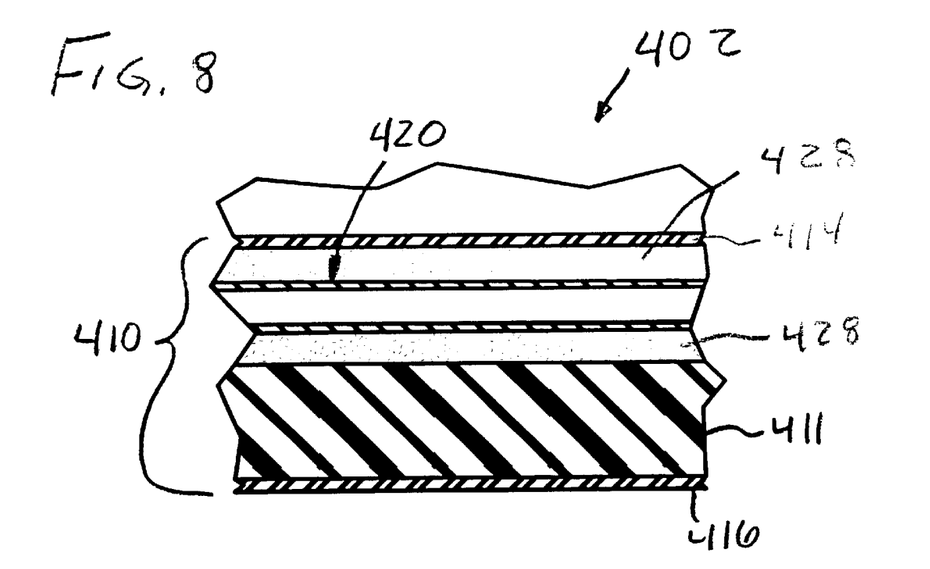
FIG. 8 is a cross-sectional view depicting an internally-insulated cooling core assembly in accordance with an embodiment of the disclosures made herein.
Figure 9:
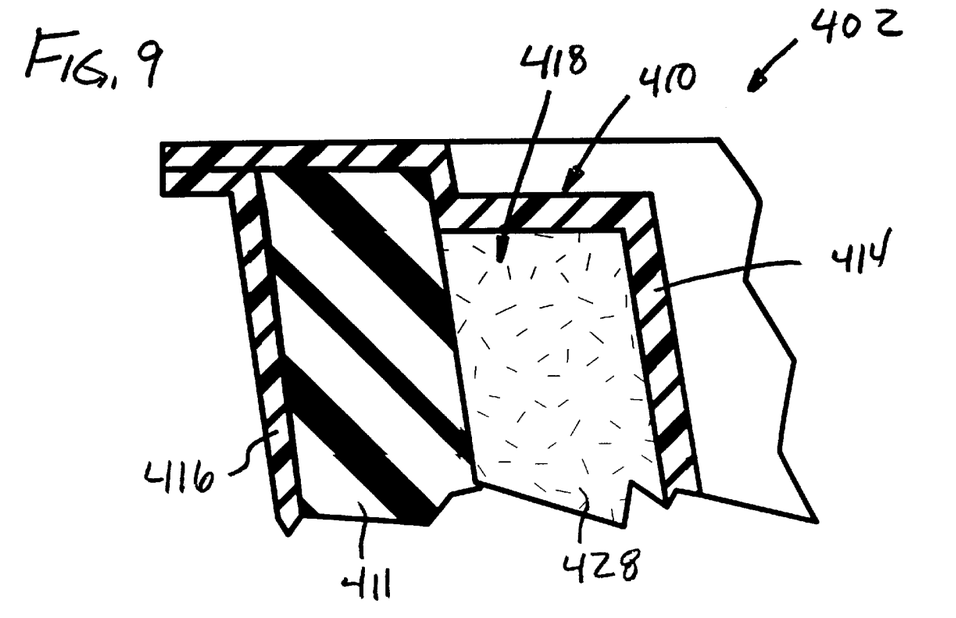
FIG. 9 is a cross-sectional view depicting an embodiment of a joining arrangement for a first cooling core liner and a second cooling core liner of the internally-insulated cooling core assembly depicted in FIG. 8.

A container body 402 according to another embodiment of the disclosures herein is disclosed in reference to FIGS. 8 and 9. From a functional standpoint, the container body 402 depicted in FIGS. 8 and 9 is essentially that same as the container body 202 disclosed above in FIGS. 2 through 6. However, from a structural standpoint, the container body 402 includes a number of differentiating aspects with respect to the container body 202 disclosed above. Only those differentiating aspects will be described below.

The container body 402 includes an internally-insulated cooling core assembly 410. The cooling core assembly 410 includes an insulating insert 411, a first cooling core shell 414 and a second cooling core shell 416. The first cooling core shell 414 and the second cooling core shell 416 are joined along mating edges using a known technique such as laser welding, ultrasonic welding solvent cement or the like, thus forming a cooling core body. The insulating insert 411 is positioned between the first cooling core shell and the second cooling core shell 416 prior to attaching the first cooling core shell 414 to the second cooling core shell 416.

A core cavity 418 is defined between the first cooling core shell 414 and the insulating insert 411. The cooling core assembly includes a cooling member 420 disposed within the core cavity 418 of the cooling core assembly 410. The term internally insulated as used herein refers to insulation being provided internal to the core cavity 418. It is contemplated herein that the insulating insert 411 may consist of one or more pieces.

At least a portion of the core cavity 418 not occupied by the cooling member 420 is filled with a super-coolable composition 428, such as the super-coolable composition as disclosed herein. As discussed below in reference to FIGS. 13 and 14 in greater detail, the cooling member 420 is capable of being connected to a cooling apparatus. The cooling apparatus is capable of circulating a super-cooled cooling fluid through the cooling member 420 for super-cooling the super-coolable composition 428.

Figure 10:
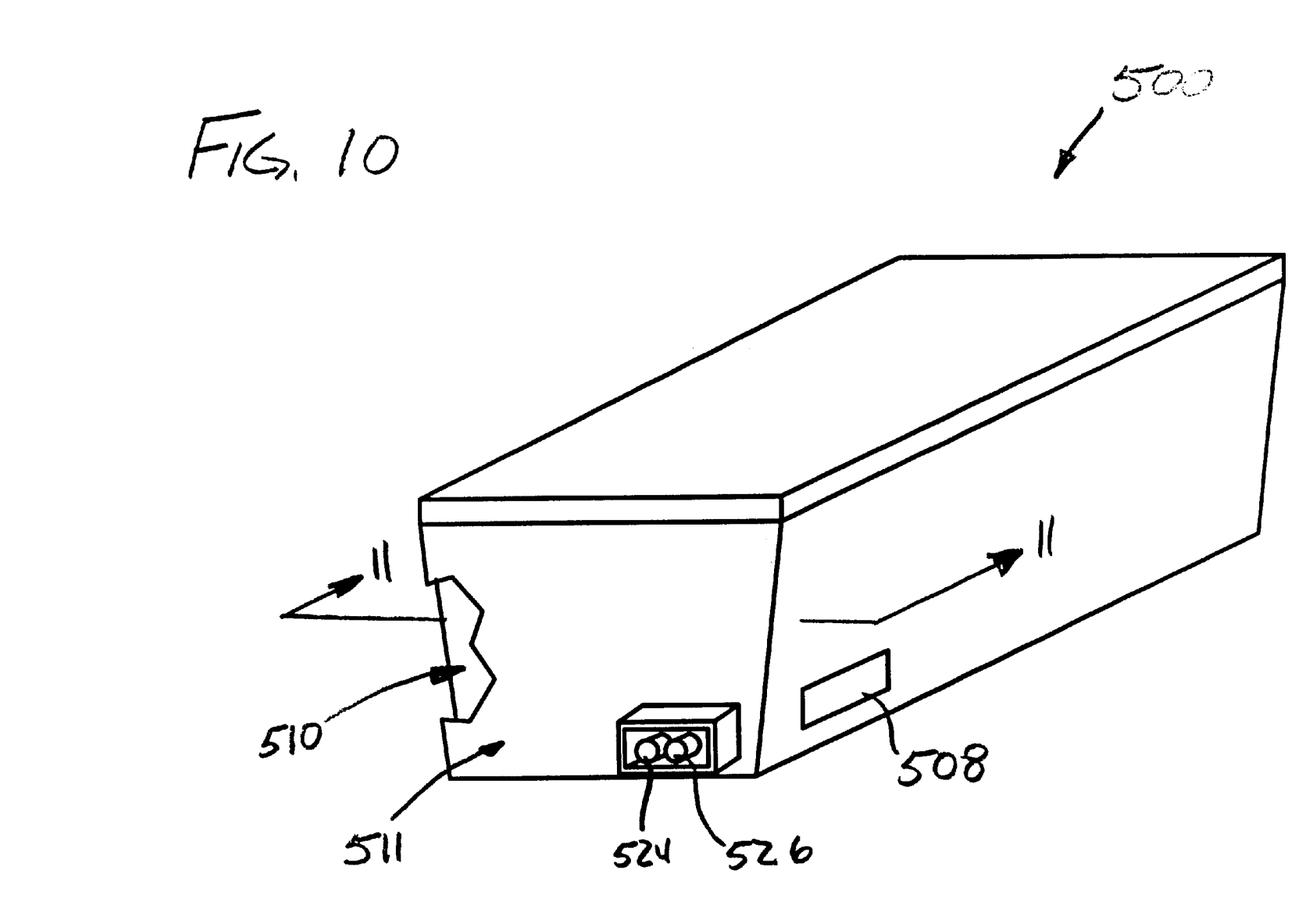
FIG. 10 is a perspective view depicting a thermal mass according to an embodiment of the disclosures herein, wherein the thermal mass includes an externally-insulated cooling core assembly.
Figure 11:
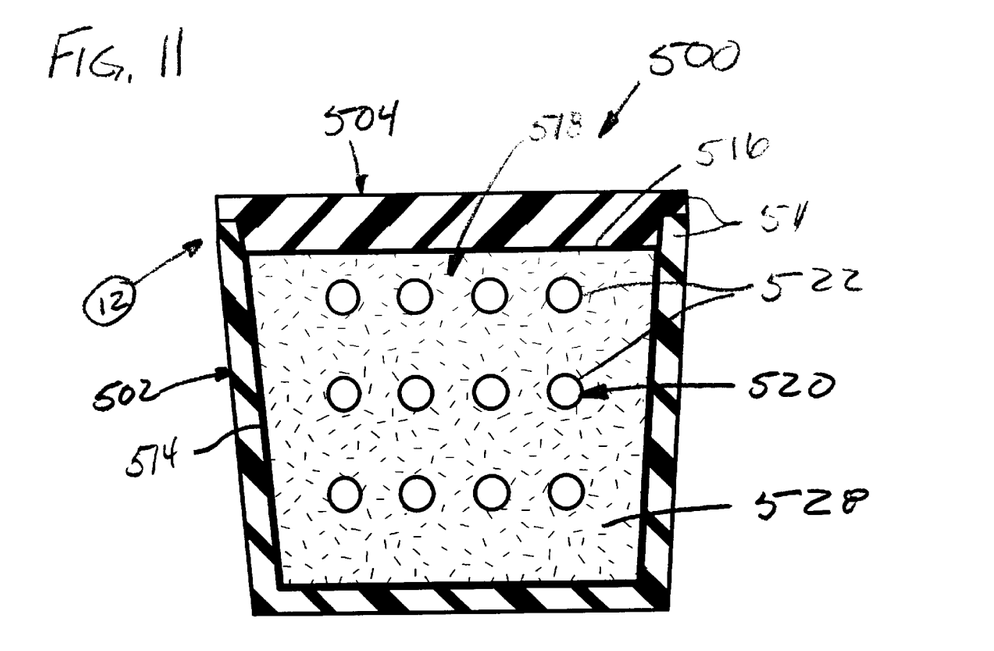
FIG. 11 is a cross-sectional view taken along the line 11—11 in FIG. 10.
Figure 12:
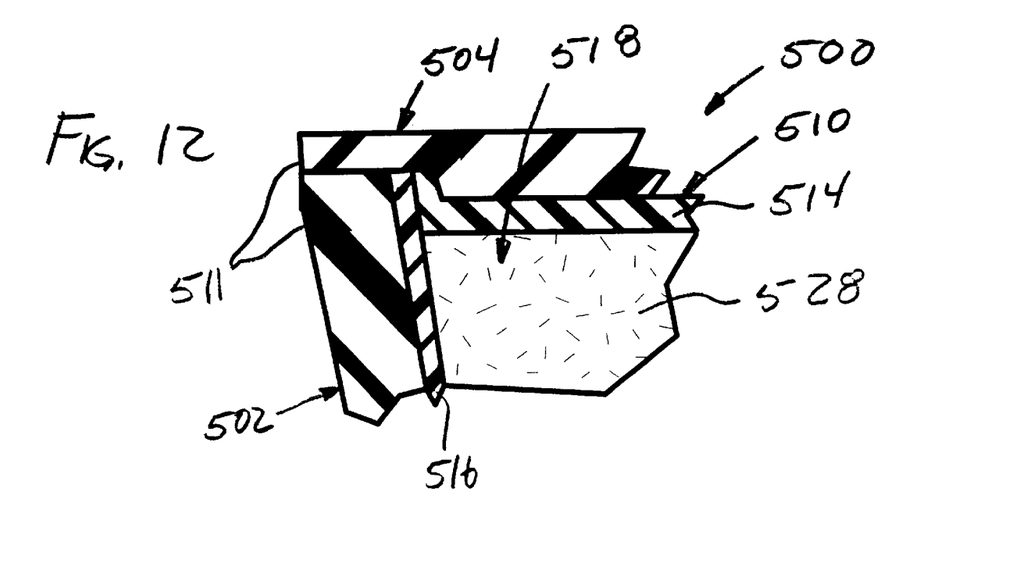
FIG. 12 is an enlarged cross-sectional view taken at the location designated 12 in FIG. 11.

A thermal mass 500 according to an embodiment of the disclosures herein are disclosed in reference to FIGS. 10 through 12. It should be understood that a thermal mass as disclosed herein, such as the thermal mass 500, is an embodiment of a cooling core assembly as disclosed herein. It is also contemplated herein that a thermal mass, such as the thermal mass 500, may have a variety of shapes (e.g. rectangular, round, etc.) and may have different profiles (e.g. flat, cylindrical, etc.).

The thermal mass 500 includes an information storage device 508, FIG. 10. It is contemplated herein that the information storage device 508 may be attached to the container cover 504 rather than to the body 502. A commercially-available radio frequency identification tags such as those offered by Texas Instruments Incorporated are examples of the information storage device 508. The information storage device 508 permits various information about the thermal mass 500 and systems connected to the thermal mass 500 to be monitored. For example, information associated with shipping routes, time-to-delivery, ambient temperatures and detailed information about the systems connected to the thermal mass 500 may be transmitted to and received from the information storage device 508.

The thermal mass 500 includes an externally-insulated cooling core assembly 510 and an insulating shell 511. The cooling core assembly 510 includes a first cooling core shell 514 and a second cooling core shell 516. The first cooling core shell 514 and the second cooling core shell 516 are joined along mating edges using a known technique such as laser welding, ultrasonic welding solvent cement or the like, thus forming a cooling core body. A core cavity 518 is defined within the cooling core body.

In one embodiment of the first cooling core shell 514 and the second cooling core shell 516, the first cooling core shell 514 and the second cooling core shell 516 are made of polyethylene and are capable of being made using a known technique such as injection molding, rotational molding or blow molding. It is contemplated herein that the first cooling core shell 514 and the second cooling core shell 516 may be independently formed, or jointly formed and subsequently cut apart.

The insulating shell 511 covers a substantial portion of the first cooling core shell 514 and the second cooling core shell 516. It is contemplated herein that the insulating shell 511 may consist of a first portion and a second portion that jointly cover a substantial portion of the first cooling core shell 514 and the second cooling core shell 516. It is contemplated herein that the insulating shell 511 may have a mono-layer (i.e. an insulating layer) construction or a multi-layer construction. A layer capable of providing conductive insulating functionality, a layer capable of providing vapor permeation functionality and a layer capable of providing radiant insulating functionality are examples potential layers in a multi-layer construction. The insulating shell 511 may be attached to or detached from the cooling core body.

Polystyrene foam and polyethylene foam are examples of material layers capable of providing conductive insulation. PolarTherm brand material offered by Polar Thermal Products LTD is an example of an insulating shell having a multi-layer construction. Furthermore, the insulating shell 511 may each be made from flexible materials, compliant materials, rigid materials or a combination thereof.

The cooling core assembly includes a cooling member 520 positioned within the core cavity 518. The cooling member 520 includes a plurality of spaced cooling member segments 522, a first cooling member coupling 524 and a second cooling member coupling 526. The first cooling member coupling 524 and the second cooling member coupling 526 extend through the second cooling core shell 516 and the insulating shell 511, FIG. 10. The cooling member 520 is configured such that the plurality of spaced cooling member segments 522 are essentially evenly spaced throughout the core cavity 518. It is contemplated herein that the cooling member 520 may have a single pass configuration or a multi-pass configuration, as discussed above in reference to FIGS. 2 through 6.

At least a portion of the core cavity 518 not occupied by the cooling member 520 is filled with a super-coolable composition 528, such as the super-coolable composition as disclosed herein. One embodiment of a technique for dispensing the super-coolable composition 528 into the core cavity 518 includes dispensing the super-coolable composition 528 through a suitable aperture (not shown) in the first cooling core shell 514 or second cooling core shell 516. The aperture is plugged or covered after the super-coolable composition 528 is dispensed into the cooling cavity 518. Another embodiment of a technique for dispensing the super-coolable composition 528 into the core cavity 518 includes dispensing the super-coolable composition 528 into the first cooling core shell 514 prior to attaching the second cooling core shell 516 to the first cooling core shell 514.

The spaced cooling member segments 522 of the cooling member 520 are essentially encapsulated in the supercoolable composition 528. The first cooling member coupling 524 and the second coil 526 coupling provide a means for connecting a cooling apparatus to the cooling member 520. As discussed below in reference to FIGS. 15 and 16 in greater detail, the cooling apparatus is capable of circulating a super-cooled cooling fluid through the cooling member 520 for super-cooling the super-coolable composition 528.

Figure 13:
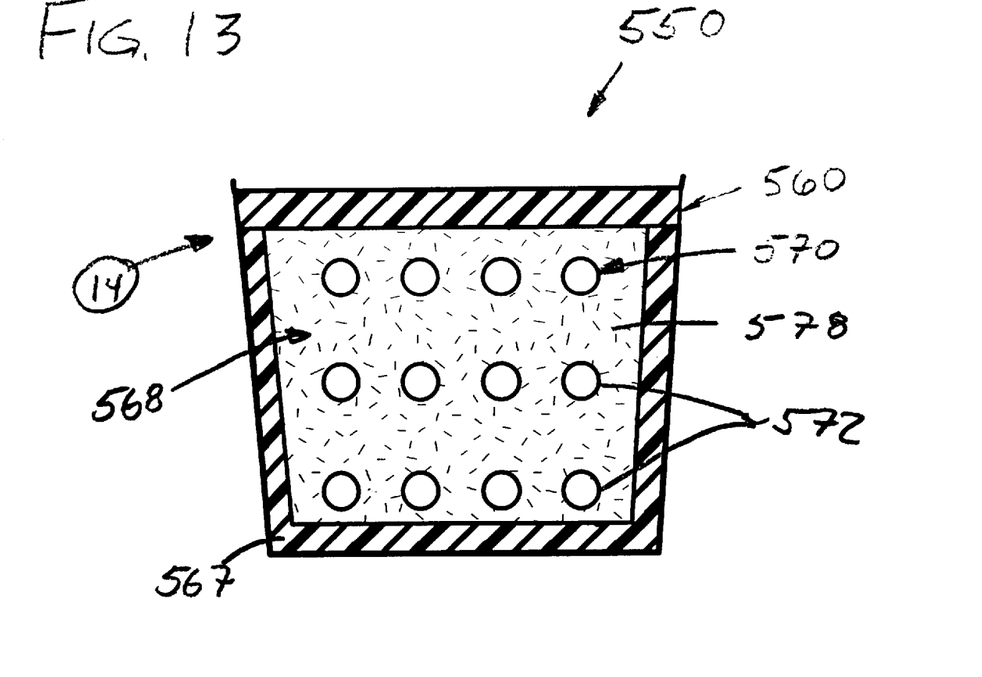
FIG. 13 is a cross sectional view depicting a thermal mass according to an embodiment of the disclosures herein, wherein the thermal mass includes an internally-insulated cooling core assembly.
Figure 14:
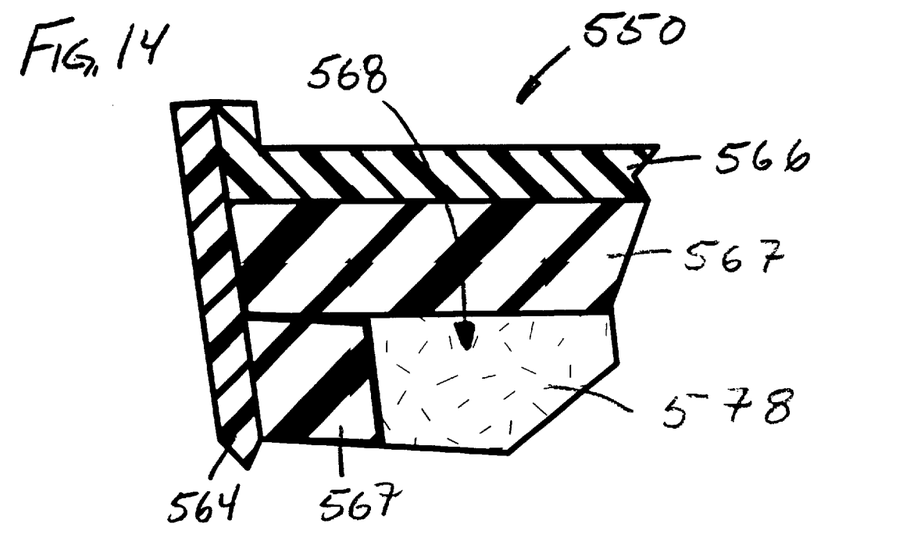
FIG. 14 is an enlarged cross-sectional view taken at the location designated 14 in FIG. 13.

A thermal mass 550 according to another embodiment of the disclosures herein is disclosed in reference to FIGS. 13 and 14. From a functional standpoint, the thermal mass 550 is essentially that same as the thermal mass 500 disclosed above in FIGS. 11 and 12. However, from a structural standpoint, the thermal mass 550 includes a number of differentiating aspects with respect to the thermal mass 500 disclosed above. Only those differentiating aspects will be described below.

The thermal mass 550 includes an internally-insulated cooling core assembly 560. The cooling core assembly 560 includes a first cooling core shell 564, a second cooling core shell 566 and an insulating insert 567. The first cooling core shell 564 and the second cooling core shell 566 are joined along mating edges using a known technique such as laser welding, ultrasonic welding solvent cement or the like, thus forming a cooling core body. A core cavity 568 is defined within the cooling core body. The insulating insert 567 is disposed within the core cavity 568 and covers a substantial portion of an interior surface of the cooling core body. It is contemplated herein that the insulating insert 567 may consist of one or more pieces.

A cooling member 570 is positioned within the core cavity 568. The cooling member 570 includes a plurality of spaced cooling member segments 572. At least a portion of the core cavity 568 not occupied by the cooling member 570 or the insulating insert 567 is filled with a super-coolable composition 578, such as the super-coolable composition as disclosed herein. The spaced cooling member segments 572 of the cooling member 570 are essentially encapsulated in the super-coolable composition 578. As discussed below in reference to FIGS. 15 and 16 in greater detail, the cooling apparatus is capable of circulating a super-cooled cooling fluid through the cooling member 570 for super-cooling the super-coolable composition 578.

Examples of applications for a thermal mass as disclosed herein include a being placed in a container for maintaining a desired thermal condition within the container, having a fluid pumped through the cooling member of the thermal mass for keeping the fluid chilled and the like. The ability to be super-cooled and the long-duration phase change capability associated with embodiments of super-coolable materials as disclosed herein advantageously permits such thermal masses to maintain a system at a reduced temperature for an extended period of time. Furthermore, the ability to pump various liquids through the cooling member of a super-cooled thermal mass as disclosed herein for cooling such liquids and the benefits associated with super-coolable materials as disclosed herein will provide advantageous results in existing and newly discovered application. For example, in an organ perfusion apparatus, an embodiment of a thermal mass as disclosed herein is capable of having a liquid perfusate pumped through a cooling member for maintaining the liquid perfusate in a chilled condition.

Figure 15:
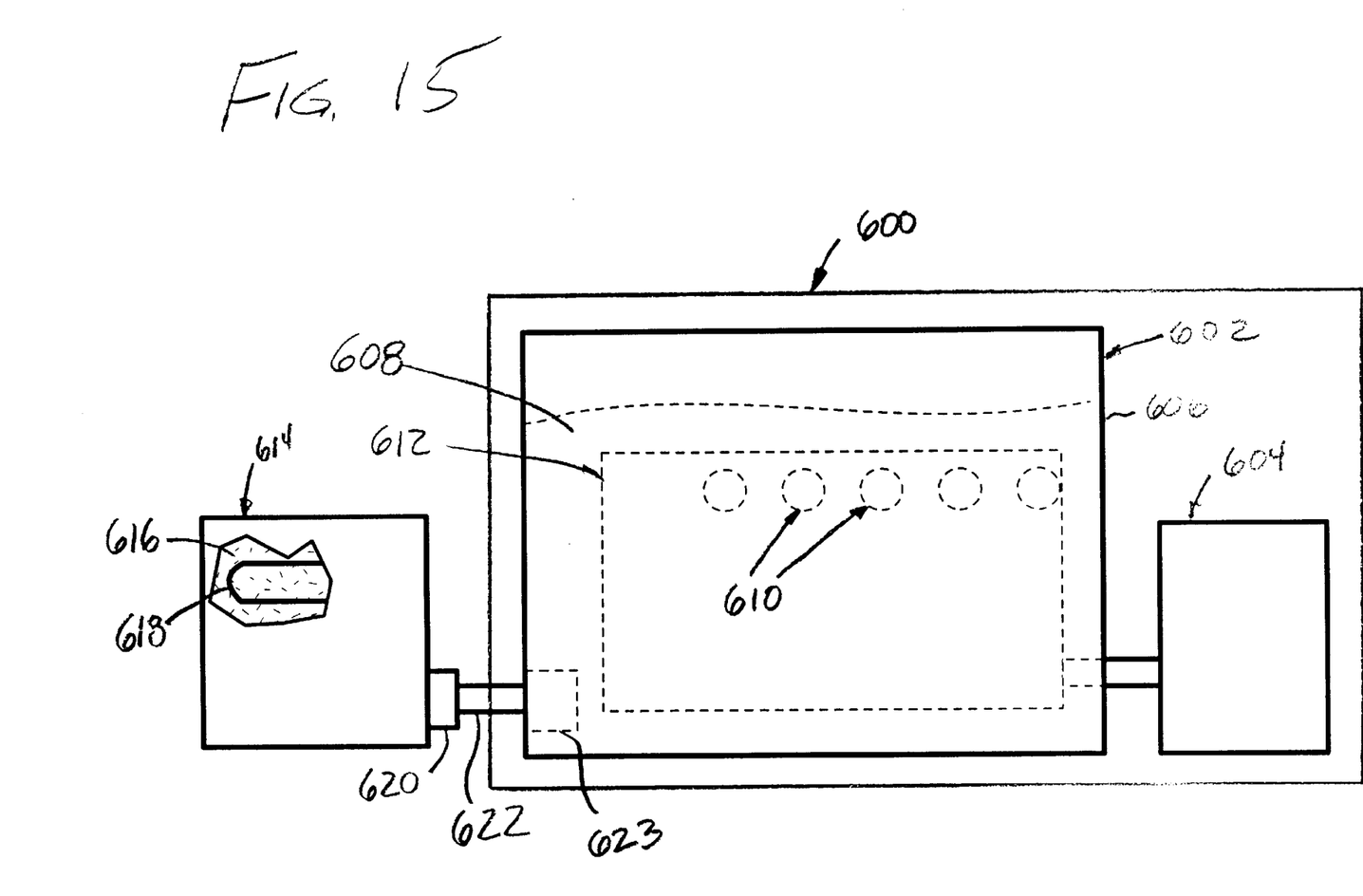
FIG. 15 is a diagrammatic view of a cooling apparatus according to an embodiment of the disclosures herein.

A cooling apparatus 600 capable of cooling articles according to embodiments of the disclosures herein is depicted in FIG. 15. The cooling apparatus 600 includes a cooling unit 602 connected to refrigeration unit 604. The cooling unit 602 preferably includes an insulated tank 606 containing a cooling fluid 608. Submersed in the cooling fluid 608 are a plurality of circulators 610 and a heat exchanging coil 612. A motor having an impeller attached thereto is an example of each one of the circulators 610. The refrigeration unit 604 is external to the insulated tank 606 and is coupled to the heat exchanging coil 612.

In one embodiment of the cooling fluid 608, the cooling fluid 608 is a food grade fluid. Examples of food grade quality cooling fluids are those based on propylene glycol, sodium chloride solutions, or the like.

The insulated tank 606 may be of any dimensions necessary to facilitate cooling of the cooling fluid 608 within the insulated tank 606. In at least one embodiment of the insulated tank 606, the insulated tank 606 is constructed to have a dimension necessary to facilitate super-cooling of the cooling fluid 608 within the insulated tank 606 and to permit one or more objects (e.g. article, biological material, food product, etc.) to be at least partially immersed in the cooling fluid 608.

The insulated container that is disclosed above in reference to FIG. 7 is an example of an object that may be immersed in the cooling fluid 608. Such an insulated container includes a super-coolable composition therein, but does not include a cooling member therein. Accordingly, immersing all or part of the insulated container in the cooling fluid 608 facilitates super-cooling of the super-coolable composition.

The heat exchanging coil 612 is preferably a "multi-path coil," which allows refrigerant from the refrigeration unit 604 to travel through multiple paths (i.e. three or more paths), in contrast to conventional refrigeration coils in which refrigerant is generally restricted to one or two continuous paths. In addition, the coil size is in direct relationship to the cross sectional area containing the measured amount of the cooling fluid 608. For example, in a preferred embodiments the tank 606 is one foot long, two feet deep and four feet wide, and uses a heat exchanging coil 612 that is one foot by two feet. If the length of the tank 606 is increased to twenty feet, then the length of the heat exchanging coil 612 is also increased to twenty feet. As a result, the heat exchanging coil 612 can be made approximately fifty percent of the size of a conventional coil required to handle the same heat load.

The circulators 610 facilitate flow of the cooling fluid 608 through the tank and over an object (e.g. article, biological material, food product, etc.) if such an object is immersed in the cooling fluid 608, and then direct the cooling fluid 608 into the heat exchanging coil 612. In at least one embodiment, heat exchanging coil 612 is so designed to remove not less than the same amount of heat from cooling fluid 608 as that is removed from an object being cooled, thereby maintaining the temperature of cooling fluid 608 in a predetermined range. The heat exchanging coil 612 is connected to the refrigeration unit 604.

In a preferred embodiment, the refrigeration unit 604 is designed to match the load requirement of the heat exchanging coil 612. Accordingly, heat is removed from the cooling fluid 608 in a balanced and efficient manner, resulting in the controlled, rapid freezing of a composition or object. The efficiency of the refrigeration unit 604 is directly related to the method employed for controlling suction pressures by the efficient feeding of the heat exchange coil 612 and the efficient output of compressors used in refrigeration unit 604.

This methodology of matching load requirements requires relatively close tolerances to be maintained between the temperatures of the refrigerant and the cooling fluid 608, and between the condensing temperature and the ambient temperature. These temperature criteria, together with the design of the heat exchange coil 120, allow the heat exchange coil 612 to be fed more efficiently. In turn, this allows the compressor to be fed in a balanced and tightly controlled manner to achieve in excess of twenty-five percent greater performance from the compressors than that which is accepted as the compressor manufacturer's standard rating.

Note that in the embodiment illustrated in FIG. 15, the refrigeration unit 604 is an external, remotely located refrigeration system. However, in another embodiment (not illustrated), the refrigeration unit 604 is incorporated into another section of the tank 606. It will be appreciated that various configurations for the refrigeration unit 604 may be more or less appropriate for certain configurations of the cooling unit 602. For example, if the tank 606 is extremely large, a separate refrigeration unit 604 may be desirable, while a portable embodiment may benefit from an integrated refrigeration unit 604. Such an integration is only made possible by the efficiencies achieved by implementing the principles as set forth herein, and particularly the use of a reduced-size heat exchanging coil.

By virtue of the refrigeration unit 604 and the heat exchanging coil 612, in a preferred embodiment, the cooling fluid 608 is cooled to a temperature of between −20 degrees Celsius and −30 degrees Celsius, with a temperature differential throughout the cooling fluid of less than about +/−0.5 degrees Celsius. In other embodiments, the cooling fluid 608 is cooled to temperatures outside the −20 degree Celsius to −30 degree Celsius range in order to control the rate at which an object or composition is to be frozen. Other embodiments control the circulation rate of the cooling fluid 608 to achieve desired freezing rates. Alternatively, the volume of the cooling fluid 608 may be changed in order to facilitate a particular freezing rate. It will be appreciated that various combinations of cooling fluid circulation rate, cooling fluid volume, and cooling fluid temperature can be used to achieve desired freezing rates.

As depicted in FIG. 15, an article 614 including a supercoolable composition 616 therein and a cooling member 618 disposed within such super-coolable composition 616 is capable of being attached to the cooling unit 602. The insulated containers disclosed above as having a cooling member therein and the thermal block disclosed above are examples of the article 614. The cooling member 618 includes a coupling means 620 capable of being attached to a cooling fluid conduit 622 of the cooling unit 602. The cooling conduit is configured for enabling the flow of the cooling fluid 608 to and from the cooling unit 602 with respect to the article 614.

Cooling member couplings as disclosed above are examples of the coupling means 620. In operation, when the cooling fluid conduit 622 is attached to the coupling means 620, the cooling fluid 608 is capable of being circulated from by a pump 623 of the cooling unit 602 through the cooling member 618 of the article 614 and back to the cooling unit 602. In this manner, the super-coolable composition 616 of the article 614 is capable of being super-cooled by the cooling apparatus 600.

Preferably, each circulator 610 includes a motors that is capable of being controlled to maintain a constant predetermined velocity of cooling fluid flow past an object while at the same time maintaining an even distribution of cooling fluid temperature within +/−0.5 degrees Celsius at all points within tank 606. The substantially constant predetermined velocity of cooling fluid circulating past the biological material, provides a constant, measured removal of heat, which allows for the vitrification of the water containing compositions and materials during freezing. In one embodiment, cooling fluid properties, such as viscosity, temperature, etc., are measured and processed, and control signals are sent to the motor of one or more of the circulators 610 to increase or decrease the rotational speed or torque of a circulator impeller, as needed. In other embodiments, the impellers of one or more of the circulators 610 are constructed to maintain a given rotational velocity over a range of fluid conditions. In such a case, the torque or rotational speed of an impeller of each circulator 610, as imparted by the attached motor, is not externally controlled. Of note is the fact that no external pumps, shafts, or pulleys are needed to implement a preferred embodiment of the disclosures herein. The motor of each one of the circulators 610 is immersed directly in the cooling fluid 608. As a result, the cooling fluid 608 provides cooling for such motors.

Figure 16:
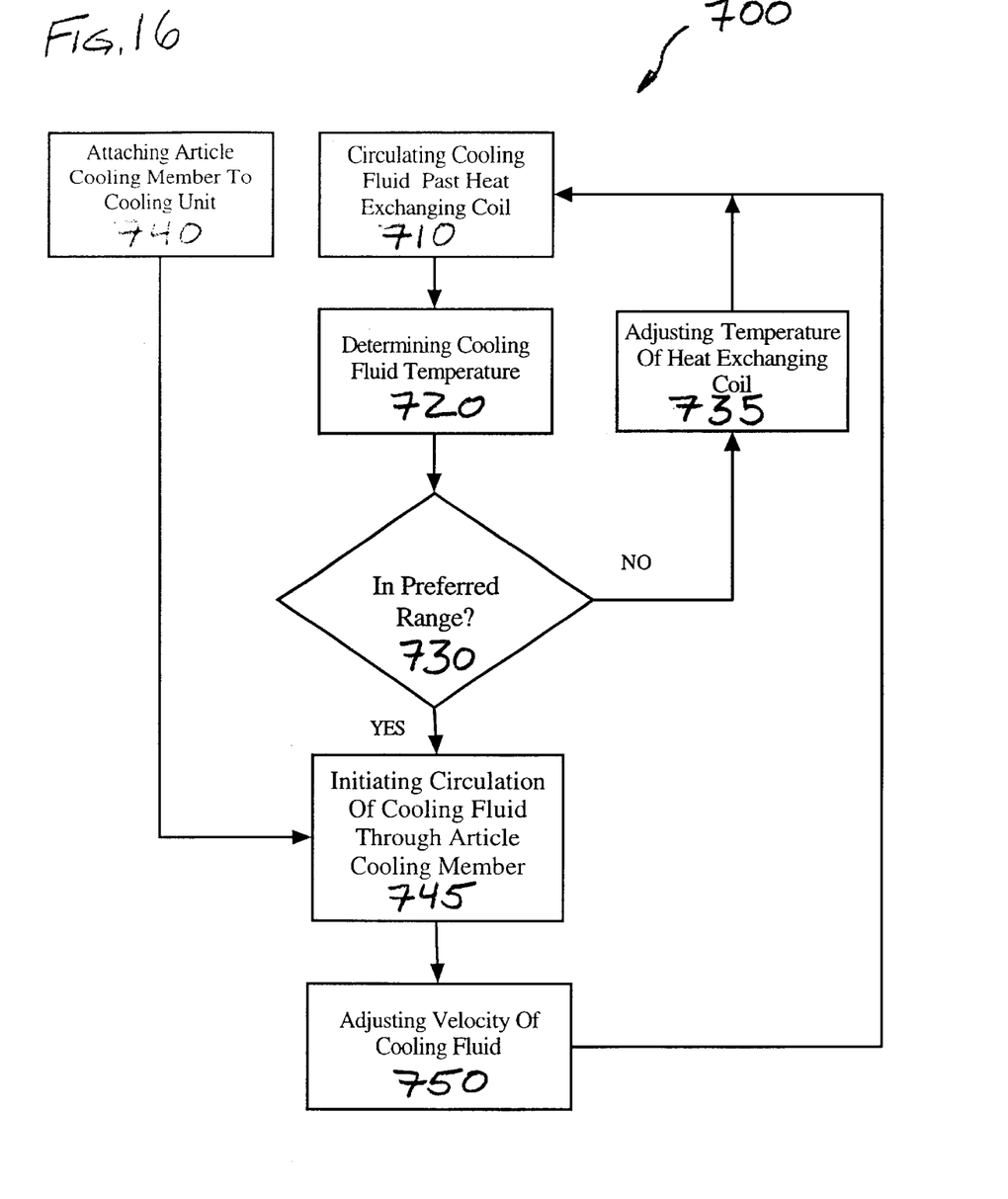
FIG. 16 is a flow diagram view of a process according to an embodiment of the disclosures herein capable of cooling an article according to an embodiment of the disclosures herein.

A method 700 according to one embodiment of the disclosures herein is depicted in FIG. 16. The method is capable of being facilitated via a suitable cooling apparatus. The method 700 enables cost efficiencies and freezing speeds that are superior to cost efficiencies and freezing speeds capable with conventional freezing techniques such as blast freezing. The cooling apparatus 600 disclosed above is an example of such a suitable cooling apparatus.

In the method 700, an operation 710 is performed for circulating a cooling fluid in a tank of the cooling apparatus past a heat exchange coil of the cooling apparatus. The heat exchange coil is operably coupled to a refrigeration system as discussed above, and is used to reduce the temperature of the cooling fluid as the cooling fluid is circulated past the heat exchange coil. In response to circulating the cooling fluid past the heat exchanging coil, an operation 720 is performed for determining the temperature of the cooling fluid in the tank. After determining the temperature of the cooling fluid, an operation 730 is performed for determining whether the temperature of the cooling fluid is within a preferred temperature range. This preferred cooling fluid temperature range may be different for different applications, however, a preferred temperature range for many applications is between −20 degrees Celsius and −30 degrees Celsius.

If the cooling fluid temperature is determined not to be within the preferred predetermined temperature range, an operation 735 is performed for adjusting the temperature of the heat exchanging coil. At least one embodiment of the operation 735 includes automatically adjusting the temperature of the heat exchanging coil. The temperature of the heat exchanging coil is capable of being adjusted via a refrigeration unit of the cooling apparatus. Increasing or decreasing the heat transfer level of the heat exchanging coil is one example of a technique adjusting the temperature of the heat exchanging coil. After performing the operation 735 for adjusting the temperature of the heat exchanging coil, the method proceeds to the operation 710 for circulating the cooling fluid past the heat exchanging coil in order to lower the temperature of the cooling fluid. Preferably, the operations 710, 720, 730 and 735 are performed continually until the cooling fluid temperature is in the preferred temperature range.

While the cooling fluid is being cooled to the proper temperature, an operation 740 is performed for attaching a cooling cool of an article to a cooling unit of the cooling apparatus. The insulated containers disclosed above as having a cooling member therein and the thermal blocks disclosed above are examples of such an article. Also as disclosed above, the cooling member is connected to the cooling unit in a manner for permitting the cooling fluid to be circulated to the cooling member from the cooling unit and back to the cooling unit from the cooling member.

After the cooling fluid temperature is determined to be within the preferred temperature range, an operation 745 is performed for initiating the flow of the cooling fluid through the cooling member of the article. As the cooling fluid passes through the cooling member, heat is removed from a super-coolable composition, such as the super-coolable composition disclosed above in reference to FIG. 1. Initially, the super-coolable material is at a higher temperature than the temperature of the cooling fluid. Thus, heat is transferred to the cooling fluid and is transported away from the article via circulation of the cooling fluid through the cooling member. According to at least one embodiment of the present invention, a substantially constant circulation of cooling fluid through the cooling member should be maintained in order to sufficiently cool the super-coolable composition.

In response to initiating the circulation of cooling fluid through the cooling member of the article, an operation 750 is performed for adjusting the velocity at which the cooling fluid is circulated through the cooling member of the article and/or through the circulators as necessary to account for changes in the cooling fluid viscosity, temperature, and the like. Preferably, the velocity at which the cooling fluid is circulated through the cooling member of the article and through the circulators is held constant by adjusting a respective force provided by a pump that controls the circulation of the cooling fluid through the cooling member and a motor attached to each circulator.

The operations illustrated in FIG. 16 are shown and discussed in a sequential order. However, the illustrated method is of a nature wherein some or all of the steps are continuously performed, and may be performed in a different order. In one embodiment of the present invention measures cooling fluid temperatures, viscosity and other fluid properties continually, and at multiple locations within the system. In another embodiment, some properties of the cooling fluid are not directly measured. Rather, the change in cooling fluid properties is determined indirectly from the rotational speed of a motor connected to the pump or from the rotational speed motors attached to respective cooling fluid circulators of the cooling unit. If the a motor is turning at a slower rate that a prescribed rate, then additional power can be supplied to such motor to return the motor to a desired rotational speed, thereby compensating for the change in cooling fluid properties. In at least one embodiment, motor attached to pumps and circulators of the cooling unit are configured to maintain a substantially constant rate of rotation. This substantially constant rate of motor rotation will result in a substantially constant rate of cooling fluid circulation.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A process of preparing a super-coolable composition, the process comprising:

forming a first mixture including water and ethanol, wherein the first mixture has a first pH level;

adjusting the pH level of the first mixture to have a second pH level different than the first pH level; and combining a water-soluble binding agent with the first mixture to form a second mixture.

2. The process of claim 1, wherein forming the first mixture includes combining the water and the ethanol at a weight-based ratio of about 70% water to about 30% ethanol.

3. The process of claim 1, wherein forming the first mixture includes combining the water and the ethanol at a weight-based ratio of less than about 70% water to greater than about 30% ethanol.

4. The process of claim 1, wherein forming the first mixture includes combining the water and the ethanol at a weight-based ratio of less than about 10% water to greater than about 90% ethanol.

5. The process of claim 1, wherein:

the first pH level of the first mixture is one of substantially less than or substantially greater than about 8; and adjusting the pH level of the first mixture includes adjusting the pH level of the first mixture to about 8.

6. The process of claim 5, wherein adjusting the pH level of the first mixture includes adding a water soluble alkaline rich substance.

7. The process of claim 5 wherein adjusting the pH level of the first mixture includes adding sodium bicarbonate.

8. The process of claim 1 wherein combining the water-soluble binding agent with the first mixture includes combining a cellulose ester-based substance with the first mixture.

9. The process of claim 8 wherein combining the cellulose ester-based substance with the first mixture includes combining a methylcellulose substance with the first mixture.

10. The process of claim 8 wherein combining the cellulose ester-based substance with the first mixture includes combining a hydroxypropyl methylcellulose substance with the first mixture.

11. The process of claim 1, further comprising:

agitating the second mixture until the viscosity of the second mixture uniformly increases to provide the second mixture with a cream-like consistency.

* * * * *